R. HANSEN.
ATTACHMENT FOR MOTOR CYCLES.
APPLICATION FILED JAN. 2, 1913.
1,102,659.
Patented July 7, 1914.
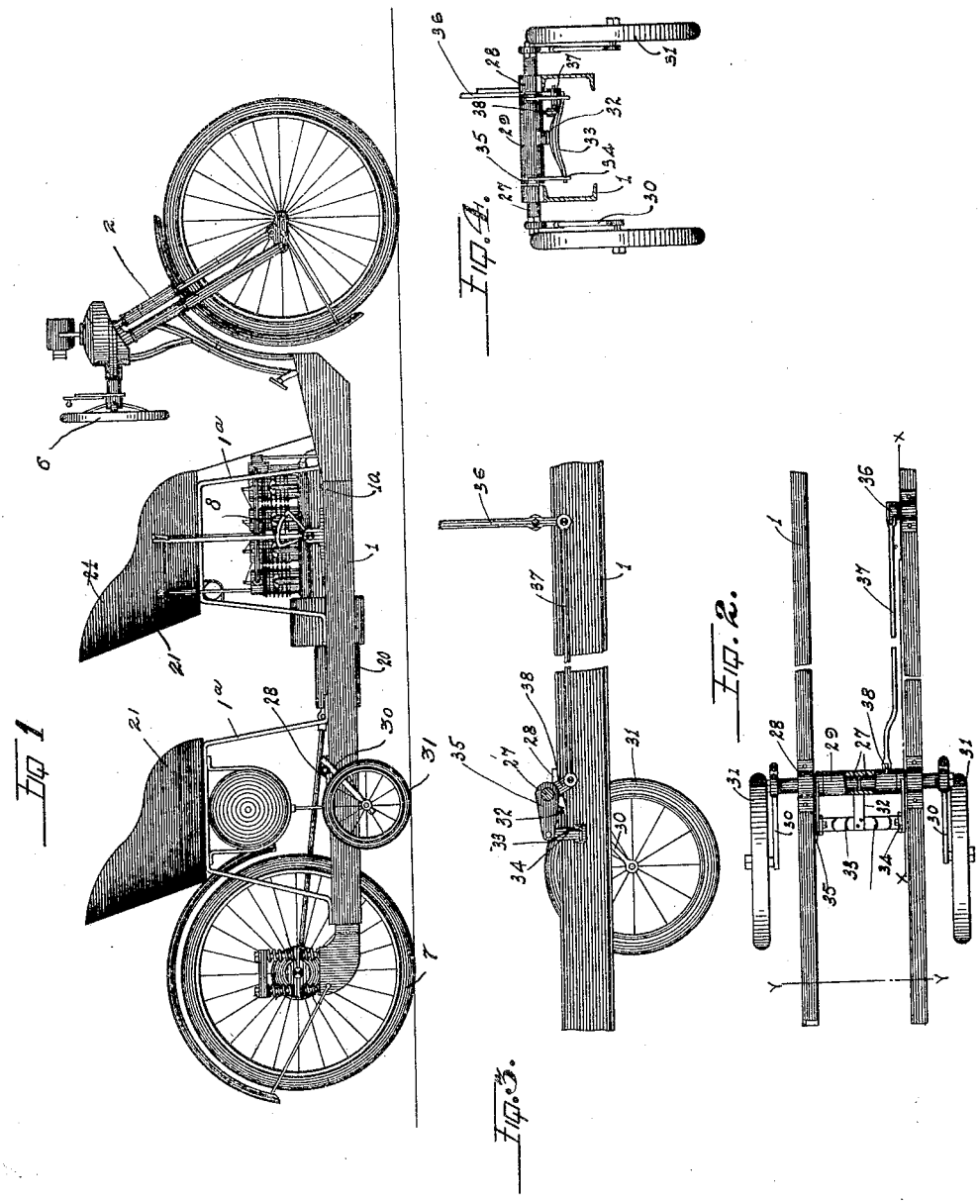
Witnesses
Clarence M. Smith
J. B. Webster
Inventor
Robert Hansen
Attorney

UNITED STATES PATENT OFFICE.

ROBERT HANSEN, OF STOCKTON, CALIFORNIA, ASSIGNOR TO NATIONAL AUTO CYCLE COMPANY, OF STOCKTON, CALIFORNIA, A CORPORATION.

ATTACHMENT FOR MOTOR-CYCLES.

1,102,659.  Specification of Letters Patent. Patented July 7, 1914.

Application filed January 2, 1913. Serial No. 739,713.

*To all whom it may concern:*

Be it known that I, ROBERT HANSEN, a citizen of the United States, residing at Stockton, in the county of San Joaquin, State of California, have invented certain new and useful Improvements in Attachments for Motor-Cycles; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in motor cycles, the object of the invention being to produce a prop or auxiliary side wheel attachment for motor cycles whereby a motor cycle consisting of a single wheel at the forward and rear ends can be provided with a suitable frame having cushion springs, which frame is so constructed as to carry seats adapted to be similar to the seats of an automobile and do away with the saddles now commonly used. As can readily be seen this will produce a much more comfortable motor cycle than those carrying the saddles and at the same time they will be perfectly safe inasmuch as I provide two auxiliary side wheels, which wheels will be adjustably mounted on each side of the frame of the motor cycle and adapted to support said motor cycle when it is to be started or stopped. Such wheels are also adapted for use as a safety device to prevent the motor cycle from overturning inasmuch as said wheels may be raised or lowered at will.
A further object of the invention is to produce a simple and inexpensive device and yet one which will be exceedingly effective for the purposes for which it is designed.
These objects, I accomplish by means of such structure and relative arrangement of the parts as will fully appear by a perusal of the following specification and claim.

On the drawings similar characters of reference indicate corresponding parts in the several views.

Figure 1 is a side elevation of the complete device. Fig. 2 is a top plan view of a fragmentary portion of the device showing the auxiliary wheels. Fig. 3 is a sectional view taken on a line X—X of Fig. 2. Fig. 4 is a sectional view taken on a line Y—Y of Fig. 2.

The numeral 1 designates the frame of the device having suitable cross supporting members 1ª to form a sufficient frame to hold the seats 21. The forward end of the frame 1 is provided with an upwardly projecting frame 2 to hold the front wheel 5 and a suitable steering mechanism 6 of any desired type.

The numeral 7 designates the rear wheel mounted on the frame 1 in a suitable spring cushion bearing as shown.

The numeral 8 designates the motor suitably positioned on the frame 1 and connected with the rear wheel 6.

Attached to the above described structure I provide the side guide wheel mechanism, which structure is as follows, namely: Two shafts 27 project through bearings 28 on the members 1 and into a sleeve 29 between said bearings and on the outer end of each shaft is a supporting bar 30 journaled in the lower end of which is a wheel 31. The sleeve 29 is provided with a projecting arm 32 carrying springs 33 on its outer end. On each end of said springs 33 is a vertical arm 34 pivotally connected with an arm 35 secured on one of the shafts 27. Hence when either of the wheels 31 encounters a jolt or jar or uneven surface it will move upwardly and turn its shaft 27 which movement will be transmitted through the corresponding arm 35 and member 34, to the springs 33, which springs will compensate for and overcome such jolt or jar, and since each of the wheels has its independent shaft in connection with said springs 33, each wheel may operate independently of the other and hence there will be no tendency to tilt the motor cycle when such wheel engages said jolts or jars. The said wheels 31 are for use in steadying the motor cycle when just starting or at any other time desired and is particularly admirably adapted for use by beginners who are just learning to operate the machine. When however, the machine has been started and is under way, these wheels 31 may be raised from the ground by means of the following structure, namely; a lever 36 connected by a link 37 with a crank 38 on the sleeve 29. By operating said lever 36, this will turn the sleeve 29 causing the arm 32 to raise the springs 33 which, being connected to the shafts 27 will turn said shafts and raise the wheels 31 from the ground or vice versa the same operation may be reversed to lower said wheels to the ground.

From the foregoing description it will readily appear that I have produced a motor cycle having a single front and rear wheel but which is provided with seats and steering gear and motor, similar to any automobile, giving consequent comfort, which motor cycle is further provided with the safety auxiliary wheels so constructed as to overcome the jolts, jars and other effects of uneven surfaces which they may encounter, all of which makes a motor cycle of extremely convenient and comfortable structure. From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:

A device of the character described comprising the combination with a motor cycle having a single forward and rear wheel, of auxiliary wheels mounted on the frame of such motor cycle, such auxiliary wheels each having a shaft journaled in the frame of said motor cycle, a sleeve on said shafts, a resilient means carried by said sleeve, means connecting each shaft with said resilient means, and means for turning said sleeve, as described.

In testimony whereof I affix my signature in presence of two witnesses.

ROBERT HANSEN.

Witnesses:
J. B. WEBSTER,
CLARENCE M. SMITH.